(12) United States Patent
Magro et al.

(10) Patent No.: US 7,644,130 B2
(45) Date of Patent: Jan. 5, 2010

(54) METHOD AND APPARATUS FOR TRANSPARENT SELECTION OF ALTERNATE NETWORK INTERFACES IN A MESSAGE PASSING INTERFACE ("MPI") IMPLEMENTATION

(75) Inventors: William R. Magro, Champaign, IL (US); David K. Poulsen, Champaign, IL (US); Alexander V. Supalov, Erftstadt (DE); Andrey B. Derbunovich, N. Novgorod Region (RU)

(73) Assignee: Intel Corporation, Santa Clara, CA (US)

( * ) Notice: Subject to any disclaimer, the term of this patent is extended or adjusted under 35 U.S.C. 154(b) by 578 days.

(21) Appl. No.: 11/323,862

(22) Filed: Dec. 30, 2005

(65) Prior Publication Data
US 2007/0156874 A1    Jul. 5, 2007

(51) Int. Cl.
*G06F 15/16* (2006.01)

(52) U.S. Cl. ............ 709/208; 709/201; 707/108
(58) Field of Classification Search ........ 709/200, 709/201, 205, 217, 218; 718/108
See application file for complete search history.

(56) References Cited

U.S. PATENT DOCUMENTS

| 5,944,779 A * | 8/1999 | Blum ................ 709/201 |
| 2004/0098447 A1* | 5/2004 | Verbeke et al. ......... 709/201 |
| 2005/0198104 A1* | 9/2005 | Kwon et al. ........... 709/200 |
| 2007/0061483 A1* | 3/2007 | Dauger ............... 709/238 |
| 2007/0097952 A1* | 5/2007 | Truschin et al. ........ 370/351 |

* cited by examiner

*Primary Examiner*—Lashonda T Jacobs
(74) *Attorney, Agent, or Firm*—Blakely, Sokoloff, Taylor & Zafman LLP

(57) ABSTRACT

A message passing interface ("MPI") cluster may be initialized and configured by reading a list of node identifiers from a file, starting a process on each node whose identifier was listed, and providing a second list of node identifiers to the process.

15 Claims, 3 Drawing Sheets

METHOD AND APPARATUS FOR TRANSPARENT SELECTION OF ALTERNATE NETWORK INTERFACES IN A MESSAGE PASSING INTERFACE ("MPI") IMPLEMENTATION

FIELD OF THE INVENTION

The invention relates to message passing interfaces ("MPI"). More specifically, the invention relates to setup, configuration, process startup, and communication establishment in an MPI implementation.

BACKGROUND

Many computational problems can be subdivided into independent or loosely-dependent tasks, which can be distributed among a group of processors or systems (a "cluster") and executed in parallel. This often permits the main problem to be solved faster than would be possible if all the tasks were performed by a single processor or system. Sometimes, the processing time can be reduced proportionally to the number of processors or systems working on the sub-tasks.

Cooperating processors and systems ("workers") can be coordinated as necessary by transmitting messages between them. Messages can also be used to distribute work and to collect results. Clusters that operate by passing messages along these lines are called message-passing interface, or "MPI," clusters.

Messages may be transferred from worker to worker over a number of different communication channels, or "fabrics." For example, workers executing on the same physical machine may be able to communicate efficiently using shared memory. Workers on different machines may communicate through a high-speed network such as InfiniBand® (a registered trademark of the Infiniband Trade Association), Myrinet® (a registered trademark of Myricom, Inc. of Arcadia, Calif.), Scalable Coherent Interface ("SCI"), or QSNet by Quadrics, Ltd. of Bristol, United Kingdom. When no other communication channel is available, a traditional data communication network such as Ethernet may be used.

Worker systems often have more than one communication channel available. For example, a system might have both an InfiniBand® interface and an Ethernet interface. (A system with more than one network interface is called "multi-homed.") The faster InfiniBand® interface may be preferred for exchanging messages with other workers that also have an InfiniBand® interface, while the Ethernet interface may be used to communicate with a control or display system, since the speed (and expense) of a corresponding specialized network interface my not be justified on the control system.

When a cluster includes many multi-homed systems, it can be difficult to configure the systems so that each one uses the most favorable communication channel to reach other workers. Systems may be geographically diverse and/or may be administered by different managers or according to different conventions. Inconsistent or incorrect system configurations may result in workers choosing sub-optimal channels to communicate, which may in turn cause the cluster to fall short of its expected computational performance. Worse, cluster users (software developers and users of MPI software) may not have appropriate skills to detect misconfigurations, or the necessary access permissions to correct them.

Methods to alleviate the impact of incorrect and/or inconsistent system configurations on MPI cluster performance may be of value in the field.

BRIEF DESCRIPTION OF DRAWINGS

Embodiments of the invention are illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

DETAILED DESCRIPTION

Figure 1:
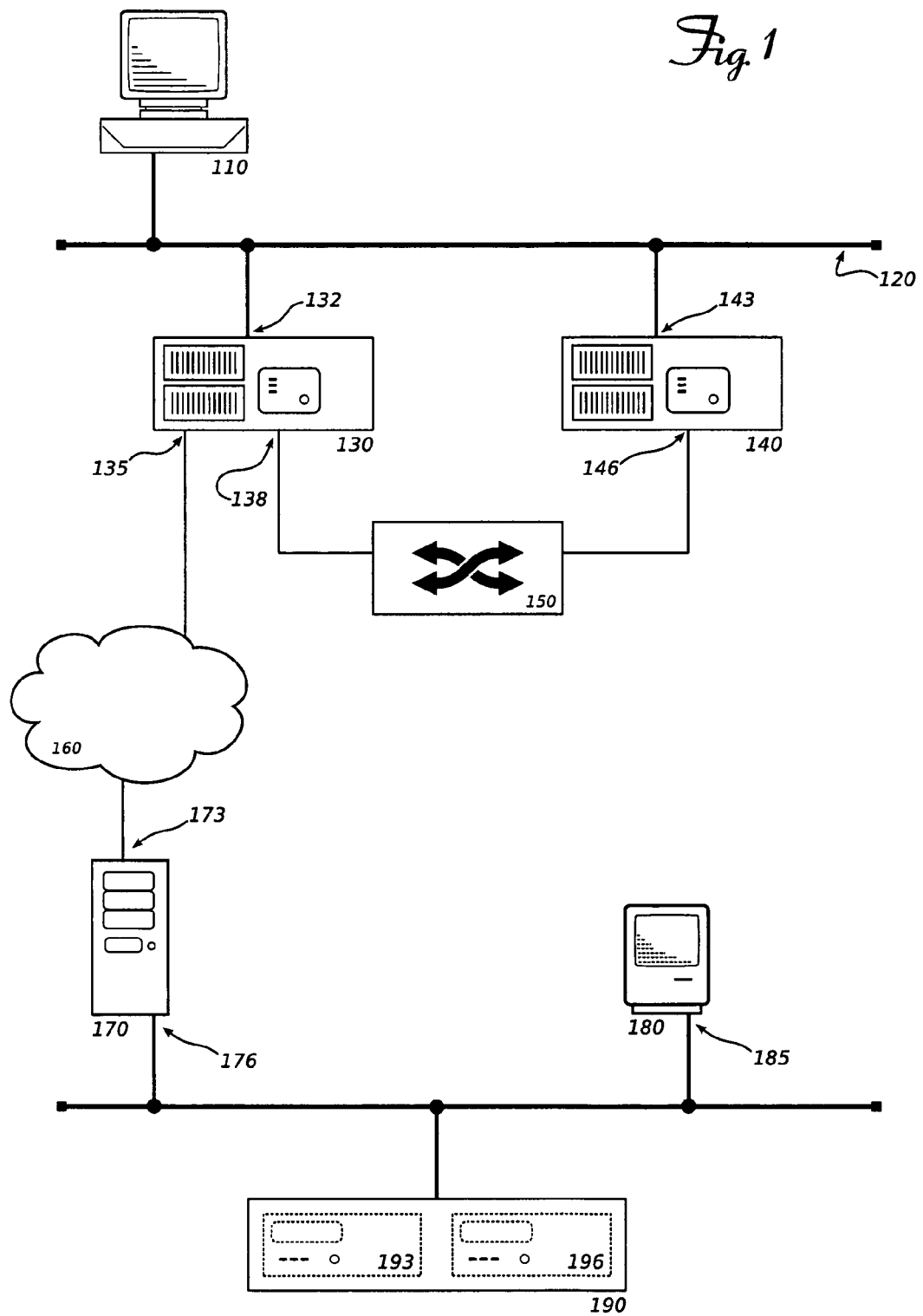
FIG. 1 shows several computers and networks that can cooperate to form a message passing interface ("MPI") cluster.

FIG. 1 shows an example computing environment that can apply an embodiment of the invention to create and operate a message passing interface ("MPI") computing cluster. Computer 110 is a control system from which the cluster is configured, operated and monitored, but it may not participate in the actual computational work of the cluster. Computer 110 communicates with other nodes via a communication medium such as Ethernet 120, according to a protocol such as the Internet Protocol ("IP"). Alternate media and protocols may also be used.

Computers 130, 140, 170 and 180 are computational nodes that perform the work assigned to the cluster. Nodes may be similar or identical (for example, nodes 130 and 140), or heterogeneous (nodes 170, 180). Each node has at least one communication interface so that it can exchange messages with other nodes as it performs its assigned tasks.

Nodes participating in a cluster that uses an embodiment of the invention may also be virtual machines as shown at 190. Element 190 represents a single computer system executing software called a "virtual machine monitor" ("VMM") or "hypervisor" that can emulate two (or more) independent systems (shown in the figure as 193 and 196). Software running on a virtual machine ("guest software") may be unaware that it is sharing physical resources with other virtual machines.

All of the communication interfaces on a node are assigned a protocol address (for example, an IP address). Nodes with more than one communication interface (nodes 130, 140 and 170) are called "multi-homed," and each interface may have a different protocol address. Virtual machines may also be multi-homed if the VMM or hypervisor presents multiple communication interfaces to the guest systems. A node that wishes to contact another node must obtain an address of one of the other node's interfaces.

Nodes are generally referred to by a human-readable name called a hostname (e.g. "hydrogen", "helium") or a fully-qualified domain name ("FQDN") that includes both a hostname and a domain name (e.g. "lithium.example.com" or "beryllium.example.com"). Hostnames and FQDNs can be translated to one or more protocol addresses by looking the name up in a text file, database, or name-resolution system such as the Domain Name Service ("DNS"), Network Information Service ("NIS"), or Lightweight Directory Access Protocol ("LDAP"). The simpler term "hostname" will be used for all identifiers that can be mapped to one or more protocol addresses.

A multi-homed host may have one common name that resolves to a list of addresses, and several interface-specific names (e.g. "boron-eth0.example.com", "boronib0.example.com") that resolve to the address of one particular interface. However, multi-homed systems are usually referred to, and usually identify themselves by, the general or omnibus hostname rather than by one of the interface-specific names (i.e. "carbon.example.com" rather than "carbon-tr2.example.com").

Multi-homed nodes may have interfaces to connect to different types of network. For example, nodes 130 and 140 have Ethernet interfaces 132 and 143 (respectively), and InfiniBand® interfaces 138 and 146 to connect to InfiniBand® switch 150. Node 130 also has a third interface 135 to connect to a wide-area network 160. In this example environment, nodes 130 and 140 can communicate over either Ethernet 120 or InfiniBand® fabric 150. However, InfiniBand® 150 may be preferred because it has a higher throughput and lower latency than Ethernet 120.

Figure 2:
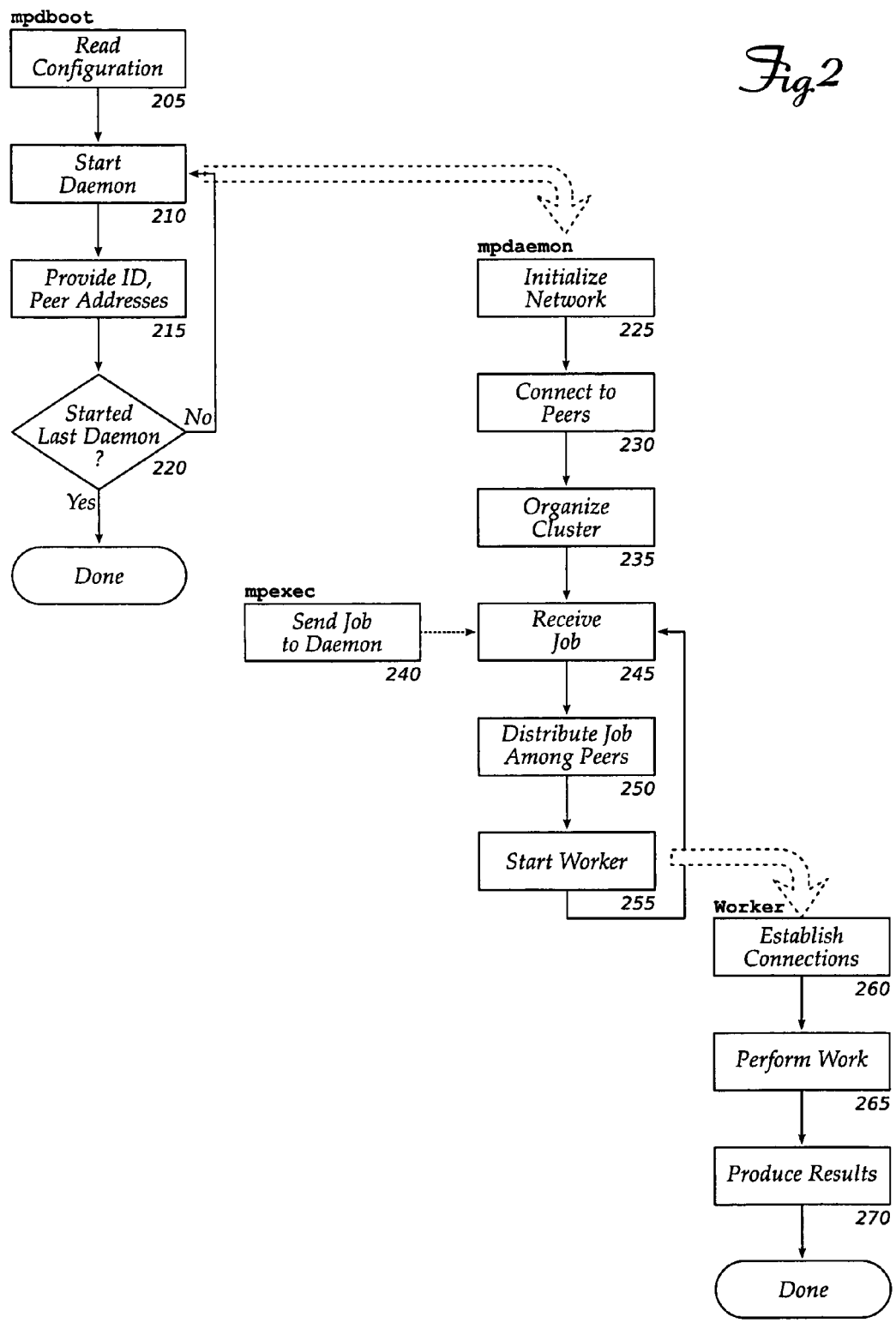
FIG. 2 is a flow chart showing how an MPI cluster can be configured and set to running a job.

Although the environment shown in FIG. 1 has a relatively small number of computing nodes, MPI clusters often have hundreds or thousands of nodes. Preparing a large number of systems to cooperate in performing a computing task can be a complex undertaking. FIG. 2 shows a flow chart of the start-up process according to an embodiment of the invention.

First, a user invokes a program to start an administrative process on each of the worker nodes. This program may be known as "mpdboot" because it "bootstraps" message passing daemons on the nodes. (A daemon is a program that performs some activity or service, usually without interacting directly with a user. "Bootstrap" is a traditional computing expression that refers to starting a process or hardware system; it derives from "pulling oneself up by one's bootstraps.")

Mpdboot reads a configuration file containing a list of nodes that are to participate in the cluster (205). The nodes may be identified by protocol address or by hostname. Multi-homed nodes are identified by an address or interface-specific name of the interface that should be used for message passing. Mpdboot may resolve each of the node names or addresses in the configuration file and produce a warning if a generic or omnibus hostname (one that resolves to more than one address) is listed.

For each node listed in the configuration file, mpdboot starts a daemon process on the node (210). This daemon may be a generic cluster administrative program, not adapted to perform any particular computation, but only to establish and maintain communication between all the nodes in the cluster. Such daemons may be useful because they can be instructed to execute software to perform a variety of different calculations. A daemon may be started by using a remote-execution protocol such as "rsh" (remote shell), "ssh" (secure shell), or similar protocol. The daemon name used in this example, "mpdaemon", is not significant.

When the daemon is started on the node, mpdboot provides an identifier the daemon should use as its own address, and in some embodiments, addresses of other nodes ("peer nodes") that are to participate in the cluster (215). The identifier may be a hostname or FQDN that resolves to a specific interface, or a protocol address that mpdboot has already resolved. Peer nodes may be identified by hostname, FQDN, or pre-resolved protocol address. Peer node identities may be a subset of the full node list in the configuration file. The own-node identifier and peer information may be provided to the daemon by setting arguments on a command line, by preparing execution environment variables, or by transmitting the information through a communication channel set up by the remote-execution facility (for example, through the "standard input" of the daemon). The daemon's own-address identifier may be provided implicitly by directing the remote-execution facility to use the specific interface desired for subsequent cluster-related communications; the daemon can discover this interface by examining its execution environment.

In one embodiment, mpdboot may provide a newly-started daemon an identifier the daemon should use as its own address, but the daemon may discover its peers by itself. If mpdboot prepares an out-of-band channel or global (cluster-wide) key/value database that each daemon can access, then the daemons can discover each other by communicating through the channel or database. Since each daemon knows its own address or identifier, it can inform its future peers of the preferred communication interface.

If daemons have been started on all the nodes listed in the configuration file (220), mpdboot is finished. Otherwise, it continues to start a daemon on the next node.

When mpdaemon starts on a worker node, it initializes its network state according to the identifier mpdboot provided (225). In a cluster where the peer nodes communicate using the Internet Protocol ("IP"), mpdaemon may create a socket and bind an IP address corresponding to the identifier to the socket. Binding this address ensures that mpdaemon will communicate over the desired network interface.

If mpdboot had not provided an identifier, mpdaemon could determine its node's identity and communication address dynamically by calling a function such as gethostname ( ), gethostbyaddr ( ), uname ( ), gethostname ( ), getaddrinfo ( ), getnameinfo ( ), or similar, but these functions obtain their information from different and possibly conflicting sources (e.g. local files, databases, etc.), so may produce inconsistent results. Alternatively, mpdboot could simply create a socket but omit the binding operation, leaving interface selection up to the underlying operating system. However, these approaches might result in mpdaemon on that node communicating over a less-favorable interface, or being unable to communicate at all if the system's hostname, FQDN, or related information was erroneous.

Once mpdaemon has initialized its network state, it connects to the peer nodes whose names or addresses were provided by mpdboot or discovered through the out-of-band channel or global database (230). Since the node has configured itself according to the identifier from mpdboot and contacts the peers at the addresses provided or discovered, all communication will occur over the desired interface(s).

When the various peer daemons establish communication between themselves, they organize themselves into a logical structure such as a ring or a tree to facilitate the distribution of messages throughout the cluster (235). Then, they simply wait for work to be assigned.

Once the cluster has booted, a user can submit a job using an application ("mpexec") that communicates with one of the daemons in the cluster (240). In some cluster topologies, any of the mpdaemons can accept the job; in other topologies, the job must be sent to a main or "root" daemon. Mpexec may need to know the identity of its local node (for example, to avoid starting worker processes on that node). If it obtains the identity from a local mpdaemon (instead of referring to local system configuration information) mpexec will also use the preferred identity as listed in the cluster configuration file and provided to mpdaemon by mpdboot. When the daemon receives the job (245), it communicates with its peers to distribute the information necessary to prepare the cluster to execute the job (250). Finally, each daemon starts one or more worker processes to perform the actual work (255) (the parent daemon may continue waiting to receive other jobs).

Each worker process establishes connections to its peers (260), using information inherited from its parent or obtained from its peers through another means of interprocess communication such as an out-of-band channel or global (cluster-wide) key/value database that may be provided by some mpdaemon implementations. Thus, the workers also use the intended communication interface specified in the mpdboot configuration file, rather than one chosen based on possibly incorrect or inconsistent information at the worker's node. The workers perform the intended calculation (265) and return their results (270), then exit.

Figure 3:
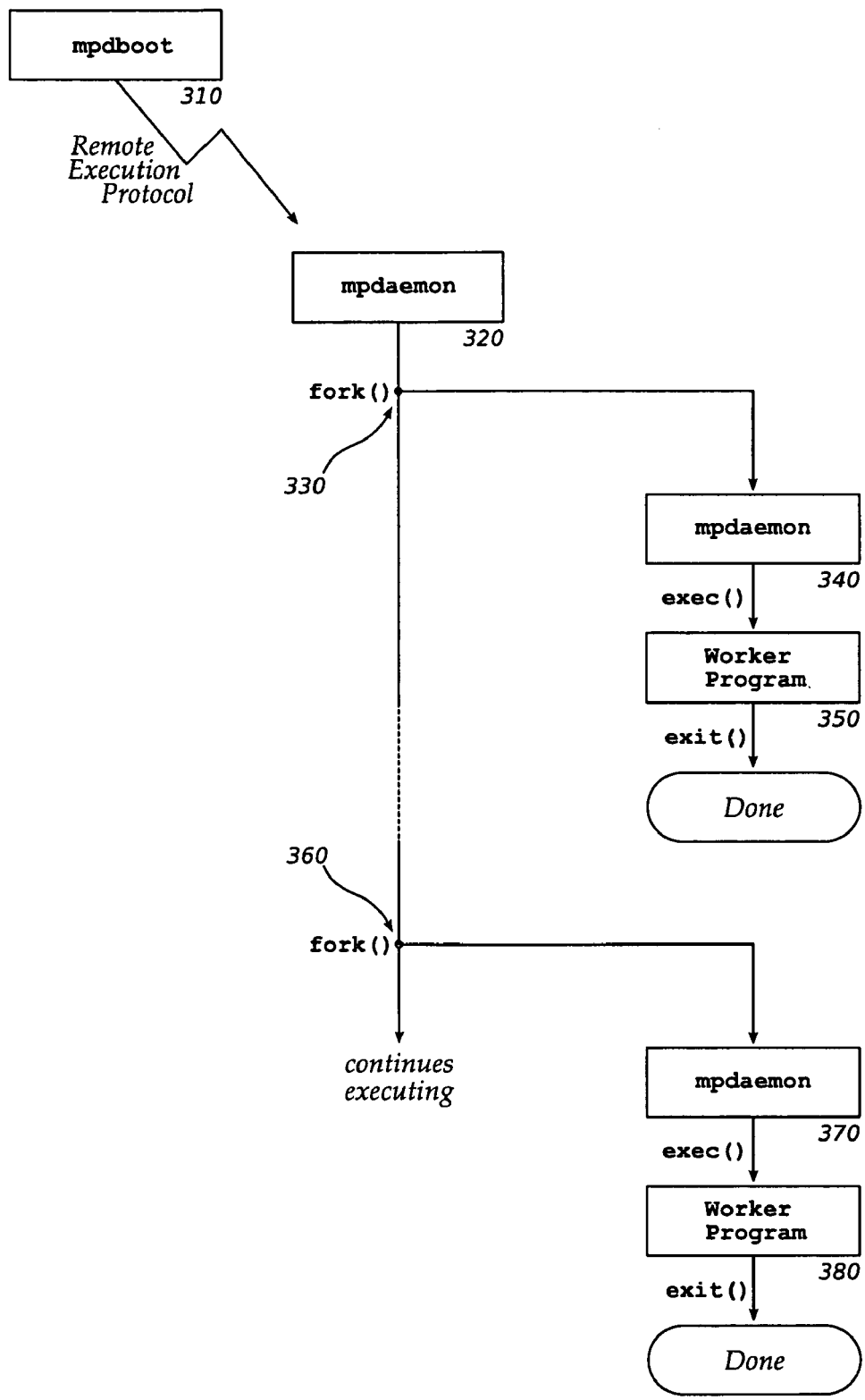
FIG. 3 is a process inheritance chart showing how daemon and worker processes are related on a node in an MPI cluster.

FIG. 3 is a process tree that shows how daemons may be started and how certain information may propagate from process to process. The example embodiment described by this figure uses process-creation and change functions available on Unix® and Unix-like systems such as Linux®, Solaris®, or OS-X®. Other operating systems may provide emulation functions to provide a Unix-like process model. Mpdboot 310 uses a remote execution protocol as described earlier to start a first administrative daemon 320 on a cluster node. This "parent" daemon receives its identity and names or addresses of its peers from mpdboot. After connecting to those peers and positioning itself within the cluster, it waits for a job to arrive. When a job is launched on the cluster, the daemon creates a copy of itself (here, this is indicated by the fork system call) (330). The copy, or "child," mpdaemon 340 carries with it all the information its parent 320 had regarding its identity and the identities of its peers. Child process 340 may establish new connections to carry messages specific to the job (cluster control messages, job data, and the like), then start worker program 350 with an exec( ) system call. Worker 350 may be specifically designed to perform the desired computation. When the job is complete, worker program 350 terminates.

Meanwhile, parent daemon 320 has been waiting for another job. It may also monitor the progress of its child (or children) and the health of its peer nodes, and report that data to a controlling or monitoring system. If another job arrives, parent daemon 320 may create another copy of itself (360); the child 370 also establishes new job-related connections and starts a worker program 380 to perform the second computation.

In some embodiments, mpexec may use the remote-execution facility to start the worker programs directly on the cluster nodes identified in the cluster configuration file (i.e. without the intermediate mpdboot and mpdaemon processes). In this case, the worker programs obtain their identity from mpexec (through a command-line argument, execution environment variable, "standard input" communication channel, out-of-band channel, or cluster-wide key/value database). The workers may also receive the identities of their peers through one of these channels, or discover their peers independently, as described above in reference to mpdaemon. It is also the workers' responsibility to establish communications' with those peers and, if necessary, to organize themselves into an appropriate topology.

Other combinations of daemons and worker processes can also benefit from an embodiment of the invention. For example, mpdboot may start mpdaemon processes on cluster nodes and mpexec may launch a job by communicating with the mpdaemons as described above, but the worker processes may nevertheless obtain, acquire, or discover the identities of their peers independently, rather than relying on a parent mpdaemon to provide that information. However, in each of the scenarios outlined (and in others where process initiation, peer discovery, communication channel establishment and cluster configuration operations are performed in a different order or by different entities) the ultimate source of node identification information is the single cluster configuration file, rather than a motley assortment of system configuration files, databases, or other—possibly inconsistent or incorrect—information repositories on cluster nodes.

An embodiment of the invention may be a machine-readable medium having stored thereon instructions which cause a processor to perform operations as described above. The instructions may be formatted as a static or shared library, as known in the art, to facilitate their use in other programs. In other embodiments, the operations might be performed by specific hardware components that contain hardwired logic. Those operations might alternatively be performed by any combination of programmed computer components and custom hardware components.

One machine-readable medium according to an embodiment of the invention may contain instructions in a human-readable form known as "source code." Source code may be processed by a suite of programs including, for example, a compiler and a linker, to prepare one or more executable files, static libraries, or shared libraries; which may then be invoked or applied to cause the processor to perform operations as described. Distributing an embodiment as source code permits it to be used on a wider variety of computer systems, since executable files and libraries are often computer- or architecture-specific and cannot be used on machines different from the one for which they were prepared.

A machine-readable medium may include any mechanism for storing or transmitting information in a form readable by a machine (e.g., a computer), including but not limited to Compact Disc Read-Only Memory (CD-ROMs), Read-Only Memory (ROMs), Random Access Memory (RAM), Erasable Programmable Read-Only Memory (EPROM), and a transmission over the Internet.

The applications of the present invention have been described largely by reference to specific examples and in terms of particular allocations of functionality to certain hardware and/or software components. However, those of skill in the art will recognize that message passing interface ("MPI") clusters can also be initialized, configured and operated by software and hardware that distribute the functions of embodiments of this invention differently than herein described. Such variations and implementations are understood to be apprehended according to the following claims.

We claim:

1. A computer-implemented method comprising:
executing a boot of a message-passing interface (MPI) cluster of nodes based on a cluster configuration file, wherein
the MPI cluster includes a multi-homed node,
the multi-homed node includes a plurality of network interfaces capable of passing messages to another node of the MPI cluster, and
the cluster configuration file includes an identifier for each node of the cluster;
initializing the multi-homed node of the MPI cluster to execute an administrative daemon based on an identifier of the multi-homed node included in the cluster configuration file, wherein the identifier of the multi-homed node specifies a first network interface for the multi-homed node to pass messages to another node of the MPI cluster;
executing a job via the MPI cluster;
starting a child daemon, via the administrative daemon, on the multi-homed node to execute a process related to the job, wherein the process specifies a second network interface for the multi-homed node to pass messages to another node of the MPI cluster; and
executing the process using the first network interface of the multi-homed node.

2. The method of claim 1 wherein the identifier for the multi-homed node is an Internet Protocol ("IP") address.

3. The method of claim 1 wherein the identifier for the multi-homed node is a fully-qualified domain name ("FQDN").

4. The method of claim 1 wherein the identifier for the multi-homed node is a hostname, the method further comprising:
determining an Internet Protocol ("IP") address corresponding to the hostname by referencing a name-to-address translation facility.

5. The method of claim 4 wherein the name-to-address translation facility is one of a text file, a database table, or a Domain Name System ("DNS").

6. The method of claim 4, further comprising:
determining all IP addresses corresponding to the hostname; and
if a number of IP addresses corresponding to the hostname is greater than one, issuing a warning.

7. A computer-readable storage medium containing instructions that, when executed by a processor, cause the processor to perform operations comprising:
executing a boot of a message-passing interface ("MPI") cluster of nodes based on a cluster configuration file, wherein
the MPI cluster includes a multi-homed node,
the multi-homed node of the MPI cluster includes a plurality of network interfaces capable of passing messages to another node of the MPI cluster, and
the cluster configuration file includes an identifier for each node of the cluster;
initializing the multi-homed node of the MPI cluster to execute an administrative daemon based on an identifier of the multi-homed node included in the cluster configuration file, wherein the identifier of the multi-homed node specifies a first network interface for the multi-homed node to establish a connection to another node of the MPI cluster;
executing a job via the MPI cluster;
starting a child daemon, via the administrative daemon, on the multi-homed node to execute a process related to the job, wherein the process specifies a second active network interface for the multi-homed node to pass messages to another node of the MPI cluster; and
executing the process using the first active network interface of the multi-homed node.

8. The computer-readable storage medium of claim 7, containing additional instructions to cause the processor to perform operations comprising:
translating the identifier of the multi-homed node to an Internet Protocol ("IP") address;
opening a communication endpoint; and
binding the first IP address to the communication endpoint.

9. The computer-readable storage medium of claim 7 wherein the child daemon inherits the identifier of the multi-homed node from the administrative daemon.

10. The computer-readable storage medium of claim 7 wherein the instructions are arranged in a form of a shared library.

11. The computer-readable storage medium of claim 7 wherein the instructions are represented as human-readable source code.

12. A system comprising:
a message-passing interface (MPI) cluster of nodes to execute a job, wherein
the MPI cluster includes a multi-homed node, and
the multi-homed node includes a plurality of network interfaces each capable of passing messages to another node of the MPI cluster;
a cluster configuration file including an identifier for each of the plurality of nodes, wherein
the MPI cluster of nodes are booted based on the cluster configuration file,
the identifier of the multi-homed node specifies a first network interface for the multi-homed node to pass messages to another node of the MPI cluster, and
the multi-homed node of the MPI cluster to execute
an administrative daemon based on the identifier of the multi-homed node, and
a child daemon, based on the administrative daemon, to execute a process related to the job, wherein the process specifies a second network interface for the multi-homed node to pass messages to another node of the MPI cluster, and the process is executed using tie first network interface of the multi-homed node.

13. The system of claim 12 wherein each identifier included in the cluster configuration file comprises an Internet Protocol ("IP") address.

14. The system of claim 12 wherein each identifier included in the cluster configuration file comprises a fully-qualified domain name ("FQDN").

15. The system of clan 12 wherein two nodes of MPI nodes are virtual machines that share a single physical system.

* * * * *

UNITED STATES PATENT AND TRADEMARK OFFICE
CERTIFICATE OF CORRECTION

| | | |
|---|---|---|
| PATENT NO. | : 7,644,130 B2 | Page 1 of 1 |
| APPLICATION NO. | : 11/323862 | |
| DATED | : January 5, 2010 | |
| INVENTOR(S) | : Magro et al. | |

It is certified that error appears in the above-identified patent and that said Letters Patent is hereby corrected as shown below:

In column 8, at line 46 delete, "clan" and insert --claim--.

Signed and Sealed this

Thirtieth Day of November, 2010

David J. Kappos
*Director of the United States Patent and Trademark Office*